US010884159B2

(12) United States Patent
Zhang et al.

(10) Patent No.: US 10,884,159 B2
(45) Date of Patent: Jan. 5, 2021

(54) LOGGING WITH JOINT ULTRASOUND AND X-RAY TECHNOLOGIES

(71) Applicant: Halliburton Energy Services, Inc., Houston, TX (US)

(72) Inventors: Zhijuan Zhang, Houston, TX (US); Weijun Guo, Houston, TX (US); Sriram Srinivasan, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 390 days.

(21) Appl. No.: 15/736,539

(22) PCT Filed: Jul. 31, 2015

(86) PCT No.: PCT/US2015/043291
§ 371 (c)(1),
(2) Date: Dec. 14, 2017

(87) PCT Pub. No.: WO2017/023282
PCT Pub. Date: Feb. 9, 2017

(65) Prior Publication Data
US 2018/0180763 A1 Jun. 28, 2018

(51) Int. Cl.
*G01V 5/12* (2006.01)
*G01V 5/14* (2006.01)
(Continued)

(52) U.S. Cl.
CPC .............. *G01V 5/12* (2013.01); *E21B 47/005* (2020.05); *E21B 47/095* (2020.05); *G01V 1/40* (2013.01);
(Continued)

(58) Field of Classification Search
CPC ............. G01V 1/40; G01V 5/12; E21B 4/005
See application file for complete search history.

(56) References Cited

U.S. PATENT DOCUMENTS

| 4,503,328 A | 3/1985 | Neufeld |
| 5,798,982 A | 8/1998 | He et al. |

(Continued)

FOREIGN PATENT DOCUMENTS

| WO | WO 2010/141014 A1 | 12/2010 |
| WO | WO 2013/112466 A1 | 8/2013 |
| WO | WO 2014/186640 A2 | 11/2014 |

OTHER PUBLICATIONS

Chi et al., "Assessment of Mud-Filtrate-Invasion Effects on Borehole Acoustic Logs and Radial Profiling of Formation Elastic Properties," Society of Petroleum Engineers, Oct. 1, 2006, vol. 9, Issue 5, pp. 553-564.

(Continued)

*Primary Examiner* — Michael J Dalbo
(74) *Attorney, Agent, or Firm* — Haynes and Boone, LLP

(57) ABSTRACT

A method and system for evaluating the cement behind casing and fully inverting acoustic properties of the material, including density and the speed of sound. A density map of the cement sheath is determined using a nuclear logging technique. An acoustic impedance value of the cement sheath is provided, either by measurement using an ultrasonic logging technique or simulated using an acoustic model. The acoustic model may assume a vertical incident plane wave and flat plates for casing and the cement sheath. From the density map and the acoustic impedance value, a map of the speed of sound in the cement sheath, or a gap therein, may be determined.

14 Claims, 8 Drawing Sheets

(51) Int. Cl.
*E21B 47/005* (2012.01)
*E21B 47/095* (2012.01)
*G01V 1/40* (2006.01)
*E21B 33/14* (2006.01)

(52) U.S. Cl.
CPC .............. *G01V 5/14* (2013.01); *E21B 33/14* (2013.01); *G01V 2210/542* (2013.01)

(56) References Cited

U.S. PATENT DOCUMENTS

| | | |
|---|---|---|
| 6,473,696 B1 | 10/2002 | Onyia et al. |
| 6,694,261 B1 | 2/2004 | Huffman |
| 6,718,265 B2 | 4/2004 | Herron et al. |
| 6,751,558 B2 | 6/2004 | Huffman et al. |
| 6,977,866 B2 | 12/2005 | Huffman et al. |
| 7,363,164 B2 | 4/2008 | Little et al. |
| 7,538,547 B2 | 5/2009 | Heaton |
| 7,675,817 B2 | 3/2010 | Moos |
| 7,830,744 B2 | 11/2010 | Wu et al. |
| 7,894,300 B2 | 2/2011 | Hawthorn et al. |
| 8,219,319 B2 | 7/2012 | Skelt |
| 8,384,379 B2 | 2/2013 | Nielsen et al. |
| 8,387,743 B2 | 3/2013 | Oraby |
| 8,473,213 B2 | 6/2013 | Zhu et al. |
| 2004/0210393 A1 | 10/2004 | Ellis et al. |
| 2010/0321023 A1* | 12/2010 | Gao .................... G01V 3/28 324/341 |
| 2011/0019500 A1 | 1/2011 | Plyushchenkov et al. |
| 2011/0108283 A1 | 5/2011 | Srnka et al. |
| 2011/0174541 A1 | 7/2011 | Strachan et al. |
| 2011/0191027 A1 | 8/2011 | Pfutzner et al. |
| 2012/0095687 A1 | 4/2012 | LeCompte |
| 2012/0119077 A1* | 5/2012 | Smaardyk ............. E21B 43/04 250/269.3 |
| 2012/0192640 A1 | 8/2012 | Minh et al. |
| 2012/0250459 A1 | 10/2012 | Sil et al. |
| 2012/0312090 A1 | 12/2012 | Klein et al. |
| 2013/0013209 A1 | 1/2013 | Zhu et al. |
| 2013/0292111 A1 | 11/2013 | Euzen |
| 2014/0052376 A1* | 2/2014 | Guo ................... E21B 47/0005 702/11 |
| 2016/0109605 A1* | 4/2016 | Bose .................. E21B 47/0005 367/35 |
| 2017/0176622 A1* | 6/2017 | Lemarenko ............ G01V 1/36 |
| 2018/0149019 A1* | 5/2018 | Bose .................. E21B 47/0005 |

OTHER PUBLICATIONS

International Search Report and the Written Opinion of the International Search Authority, or the Declaration, dated Apr. 25, 2016 PCT/US2015/043291, 17 pages, ISA/KR.

\* cited by examiner

US 10,884,159 B2

LOGGING WITH JOINT ULTRASOUND AND X-RAY TECHNOLOGIES

PRIORITY

The present application is a U.S. National Stage patent application of International Patent Application No. PCT/US2015/043291, filed on Jul. 31, 2015, the benefit of which is claimed and the disclosure of which is incorporated herein by reference in its entirety.

TECHNICAL FIELD

The present disclosure relates generally to oilfield equipment, and in particular to downhole tools, drilling systems, and drilling techniques for drilling wellbores in the earth. More particularly still, the present disclosure relates to logging systems and methods for evaluating one or more characteristics of a cement sheath in a wellbore between a casing and the formation.

BACKGROUND

The use of the ultrasonic waveforms may be used to evaluate the quality of the cement sheath between wellbore casing and a formation. In particular, ultrasonic logging may be used for flaw detection in the cement sheath by determining whether material behind the casing is solid or fluid. A logging tool, which may have one or more ultrasonic transmitters and one or more ultrasonic receivers, is lowered into a wellbore and measurements are taken at various depths. Ultrasonic waves are transmitted from the logging tool towards the formation, and reflected from the casing, cement sheath, and formation. The reflected waves are received, recorded, processed, and interpreted to determine the presence, or lack thereof, of cement between the casing and the formation or other wellbore wall.

In particular, ultrasonic waveform may be used to evaluate the cement sheath by determining the impedance of the material next to the casing itself. The impedance is a function of both bulk density and the speed of sound of the drilling fluid, casing, cement sheath, and formation. Accordingly, impedance is normally mathematically calculated using estimated properties of the casing, cement, mud and other materials in a complicated method requiring extensive knowledge of a routineer in the field.

Generally, traditional ultrasonic logging techniques can only provide the acoustic impedance of the material behind the casing. It is a challenge for ultrasonic logging to fully invert related important material properties, such as material velocity and density. Moreover, ultrasonic logging tools are not capable of discriminating the size of a gap present in the cement sheath. For example, avoid between the casing and the cement sheath will give the same reading regardless of whether the void is a millimeter thick or centimeters thick.

BRIEF DESCRIPTION OF THE DRAWINGS

Embodiments are described in detail hereinafter with reference to the accompanying figures, in which.

DETAILED DESCRIPTION

Figure 1:
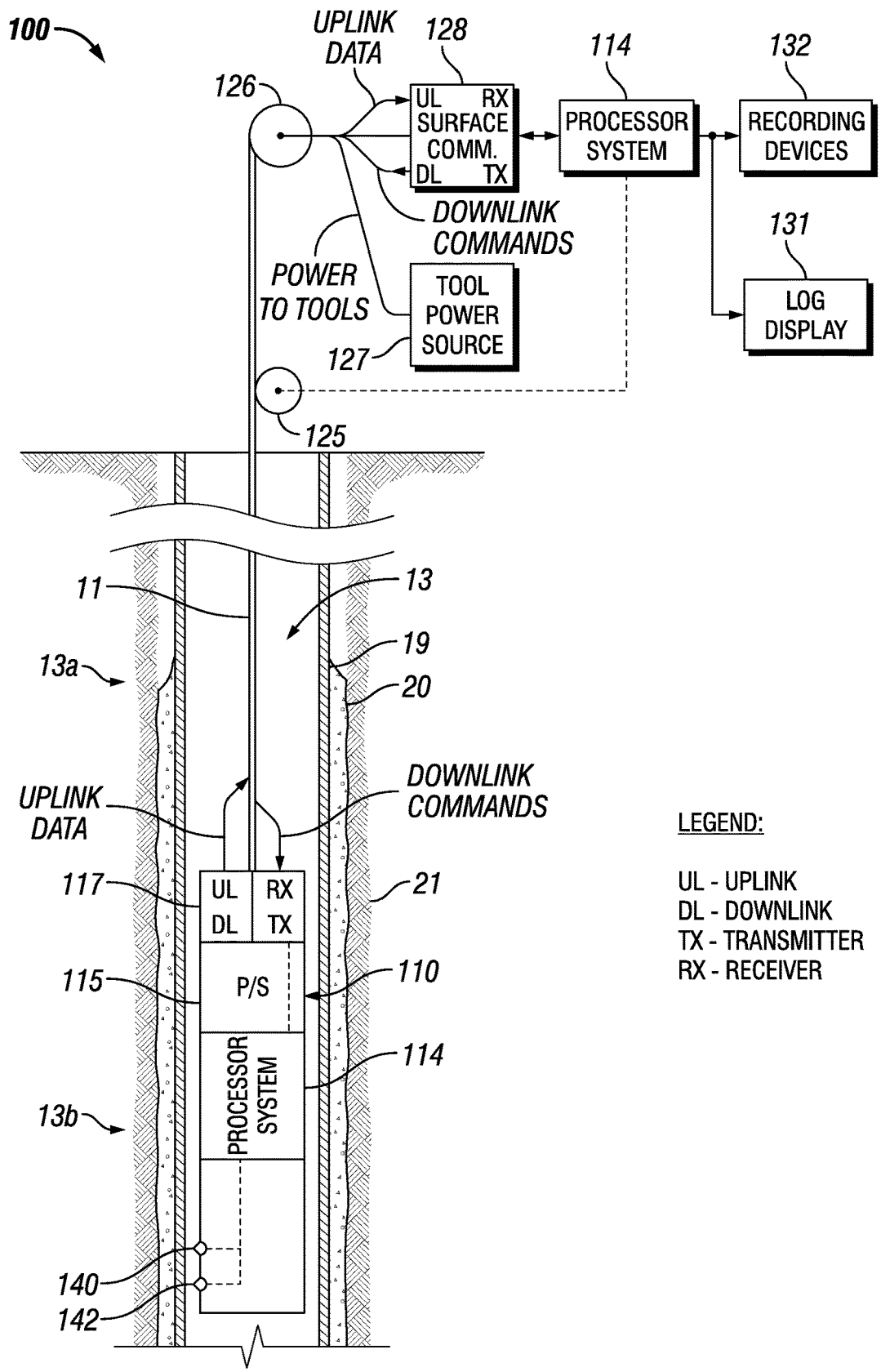
FIG. 1 is a block-level schematic diagram of a logging system according to an embodiment, showing a logging tool suspended by wireline in a well and a processing system.

The present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

Figure 2:
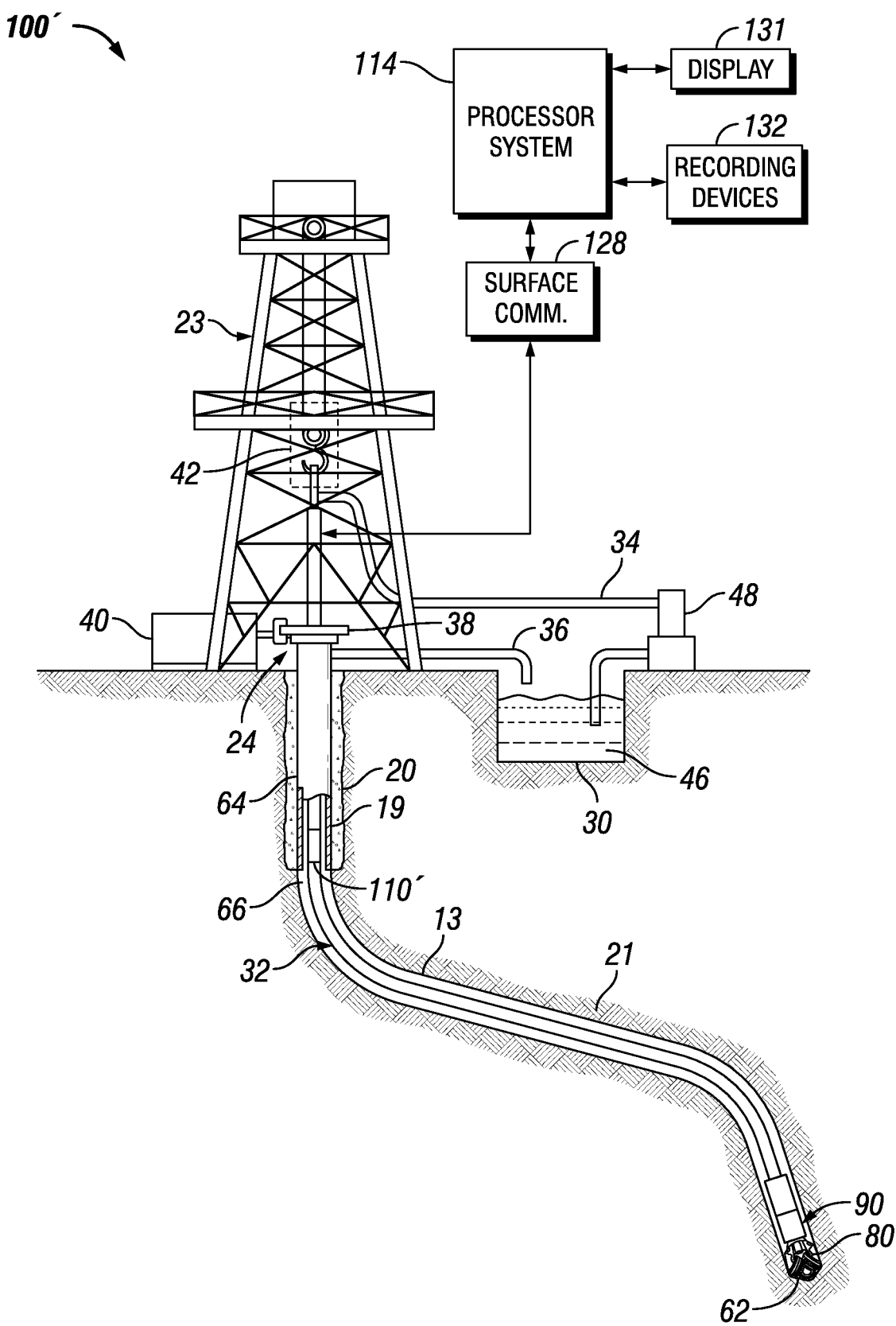
FIG. 2 is a block-level schematic diagram of a logging while drilling system according to an embodiment, showing a drill string and a drill bit for drilling a bore in the earth, a logging tool disposed along a drill string, and a processing system.

Referring to FIG. 1, a wellbore 13 may be drilled by a drill bit on a drill string as illustrated in FIG. 2. Wellbore 13 may be lined with casing 19 and a cement sheath 20. For illustrative purposes, a shallow portion 13*a* of wellbore 13 lacks a proper cement bond, while a deeper portion 13*b* of wellbore 13 has a good cement bond.

According to one or more embodiments, a logging system, indicated generally by reference number 100, may include a conveyance 11, which may include a wireline or slickline cable, coiled tubing, or jointed tubing, for example. Conveyance 11 may suspend and selectively position a logging tool 110 in wellbore 13. Depending on the type of conveyance 11 used, conveyance 11 may be spooled on a cable reel 126 or drum for storage. A sheave or arcuate rail 125 may be provided for guiding conveyance 11 into wellbore 13. Sheave 125 may include a suitable detector arrangement to provide depth measuring information of logging tool 110. Conveyance 11 may include power conductors to provide power to a power supply 115 located within logging tool 110 from a power source 127 located at the surface of wellbore 13.

Logging tool 110 may have a protective housing which may be fluid tight, be pressure resistant, and support and protect internal components during deployment. Logging tool 110 may enclose logging systems using one or more technologies to generate data useful in analysis of wellbore 13, casing 19, cement sheath 20, or in determining the nature of the formation 21 in which wellbore 13 is located. In particular, logging tool 110 may be provided for assessing the quality of the bond or other characteristics of cement sheath 20 between casing 19 and formation 21. Other types of tools may also be included in logging tool 110.

According to one or more embodiments, logging system 100 may include a processor system 114. Processor system 114 may be located within logging tool 110, at the surface of wellbore 13, or remotely, such as by internet connection. Other suitable combinations or arrangements may also be used to implement processor system 114. For example, as shown in FIG. 1, processor system 114 may be a distributed system, with various functions performed in logging tool 110 and other functions performed at the surface of wellbore 13, for example. Accordingly, electrical or fiber optic conductors in conveyance 11 may connect logging tool 110 with surface-located equipment. Logging tool 110 may include a communication module 117 having an uplink communication device, a downlink communication device, a data transmitter, and a data receiver. Similarly, a surface communication module 128 may an uplink communication device, a downlink communication device, a data transmitter and receiver.

Processor system 114 may be coupled to a nuclear source 140 and a nuclear detector 142 located within logging tool 110 for controlling, recording, and processing data acquisition operations, as described hereinafter. Processor system 114 may also be coupled to a logging display 131, and one or more recording devices 132 located at the surface of wellbore 13.

Processor system 114 may include analog circuitry such as oscillators, phase lock loops, amplifiers, frequency multipliers, frequency dividers, filters, phase detectors, mixers, and the like. Processor system 114 may include digital circuitry such as microprocessors, microcontrollers, field-programmable gate arrays, digital-to-analog converters, analog-to-digital converters, buffers, latches, memory, drivers, multiplexors, universal asynchronous receivers/transmitters, and the like. Memory may include both random access memory (RAM) and non-volatile memory such as Flash memory or electrically erasable programmable read-only memory (EEPROM). Discrete electronic components may be combined in one or more application-specific integrated circuits (ASICs) as appropriate. Memory may be used to store an acoustic model of casing 19 and cement sheath 20, as described hereinafter.

FIG. 2 illustrates a system view of a logging while drilling (LWD) system, referred to generally by the reference number 100', of the present disclosure. Wellbore 13 may be lined or partially lined with casing 19 and a cement sheath 20. LWD system 110' may include a land drilling rig 23. However, teachings of the present disclosure may be satisfactorily used in association with offshore platforms, semi-submersible, drill ships, or any other drilling system satisfactory for forming wellbore 13 extending through one or more downhole formations 21.

Drilling rig 23 may be located proximate a well head 24 and may be operable to raise, lower, and rotate a drill string 32 through well head 24 and within wellbore 13. Drilling rig 23 may include a rotary table 38, rotary drive motor 40, and other equipment associated with operation of drill string 32. For some applications drilling rig 23 may also include top drive motor or top drive unit 42.

The lower end of drill string 32 may include a bottom hole assembly 90, which may carry at a distal end a rotary drill bit 80. Drilling fluid 46 may be pumped from reservoir 30 by one or more mud pumps 48, through conduit 34, to the upper end of drill string 32 extending out of well head 24. The drilling fluid 46 then flows through the longitudinal interior 33 of drill string 32, through bottom hole assembly 90, and exits from nozzles formed in rotary drill bit 80. At bottom end 62 of wellbore 60, drilling fluid 46 may mix with formation cuttings and other downhole fluids and debris. The drilling fluid mixture then flows upwardly through an annulus 66 to return formation cuttings and other downhole debris to the surface. Conduit 36 may return the fluid to reservoir 30, but various types of screens, filters and/or centrifuges (not expressly shown) may be provided to remove formation cuttings and other downhole debris prior to returning drilling fluid to reservoir 30. Various types of pipes, tube and/or hoses may be used to form conduits 34 and 36.

Bottom hole assembly 90 may include a downhole mud motor and various other tools, such as those that provide logging or measurement data and other information from the bottom 62 of wellbore 60. Measurement data and other information may be communicated from end 62 of wellbore 60 using logging while drilling techniques and converted to electrical signals at the well surface to, among other things, monitor the performance of drilling string 32, bottom hole assembly 90, and associated rotary drill bit 80.

According to one or more embodiments, bottom hole assembly 90 or drill string 32 carries logging tool 110'. Logging tool 110' may have a protective housing arranged for connection within drill string 32 or bottom hole assembly 90 which may be fluid tight, be pressure resistant, and support and protect internal components during deployment. Logging tool 110' may be provided for assessing the quality of the bond or other characteristics of cement sheath 20 between casing 19 and formation 21. Other types of tools may also be included in logging tool 110'.

According to one or more embodiments, LWD system 100' may include a processor system 114. Processor system 114 may be located within logging tool 110', at the surface of wellbore 13, or remotely, such as by internet connection. Other suitable combinations or arrangements may also be used to implement processor system 114. For example, processor system 114 may be a distributed system, with various functions performed in logging tool 110' and other functions performed at the surface of wellbore 13, for example. Communication between logging tool 110' and the surface may be provided using conventional telemetry techniques, such as mud pulse telemetry.

Processor system 114 may be coupled to a nuclear source and a nuclear detector located within logging tool 110' for controlling, recording, and processing data acquisition operations, as described hereinafter. Processor system 114 may also be coupled to a logging display 131, and one or more recording devices 132 located at the surface of wellbore 13.

As noted above, processor system 114 may include analog circuitry such as oscillators, phase lock loops, amplifiers, frequency multipliers, frequency dividers, filters, phase detectors, mixers, and the like. Processor system 114 may include digital circuitry such as microprocessors, microcontrollers, field-programmable gate arrays, digital-to-analog converters, analog-to-digital converters, buffers, latches, memory, drivers, multiplexors, universal asynchronous receivers/transmitters, and the like. Memory may include both random access memory (RAM) and non-volatile memory such as Flash memory or electrically erasable programmable read-only memory (EEPROM). Discrete electronic components may be combined in one or more application-specific integrated circuits (ASICs) as appropriate. Memory may be used to store an acoustic model of casing 19 and cement sheath 20, as described hereinafter.

Figure 3:
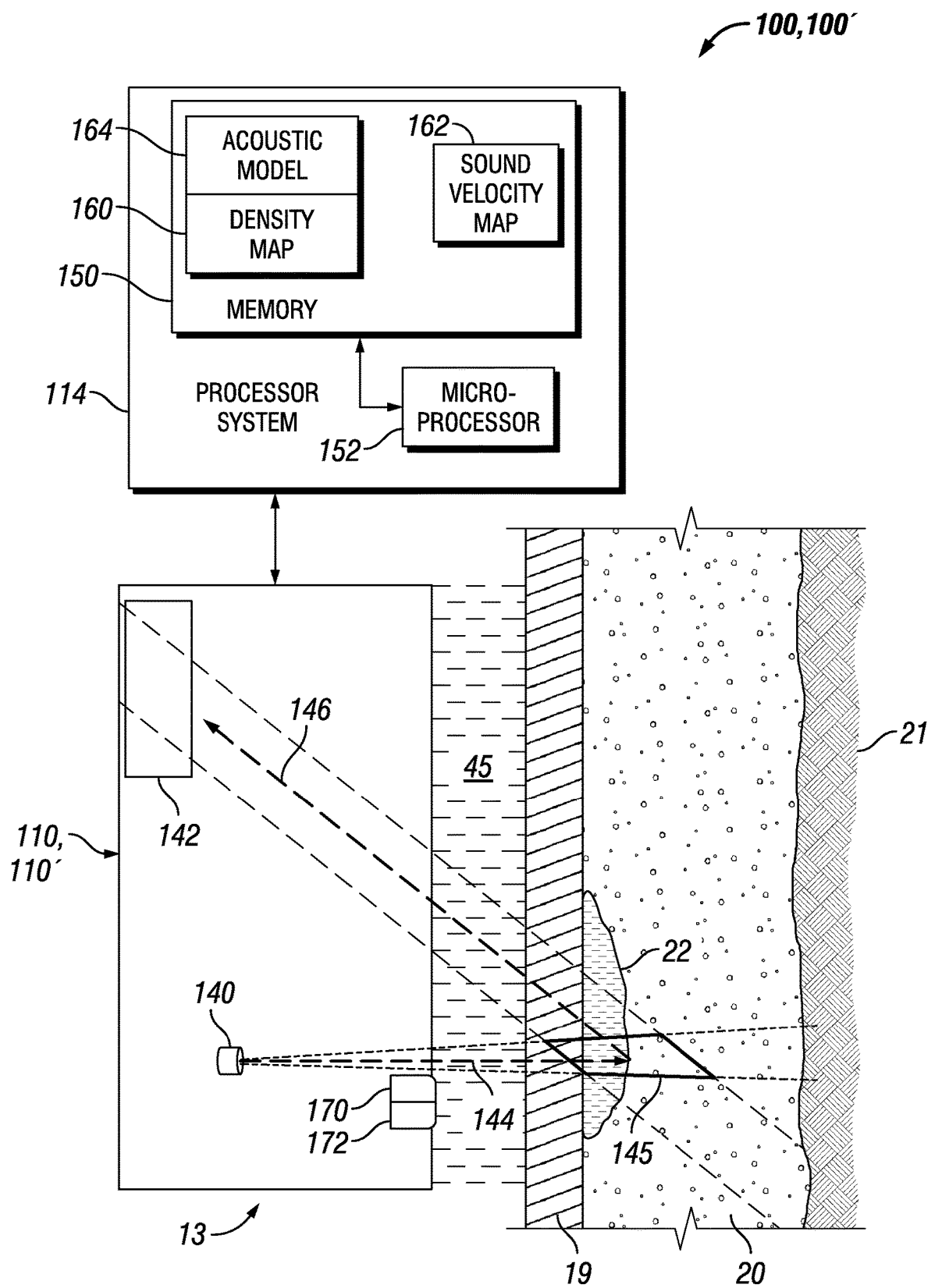
FIG. 3 is a block-level schematic diagram of a generic logging or logging while drilling system according to an embodiment, showing logging tool and a processing system.
Figure 4:
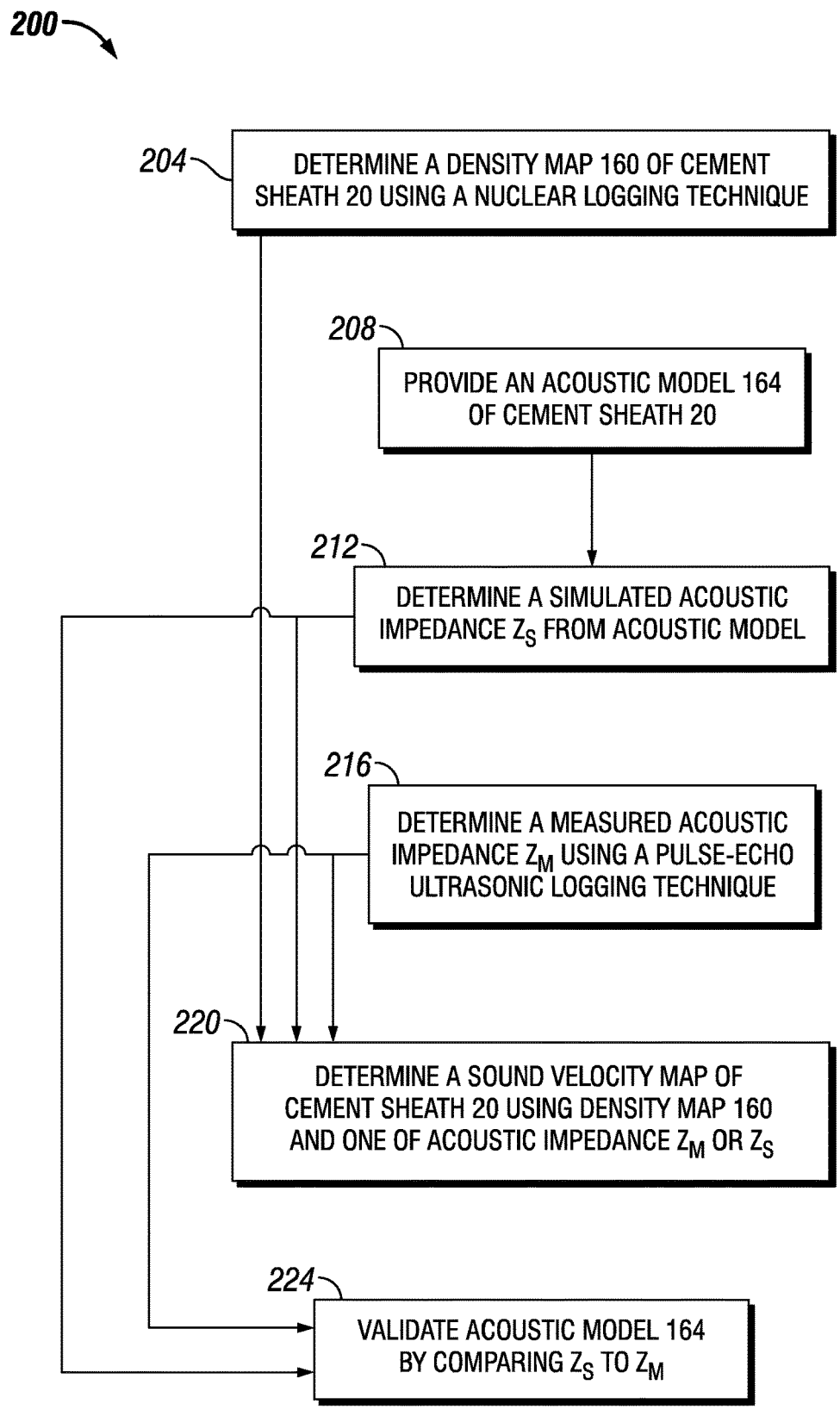
FIG. 4 is a flowchart of a generic logging or logging while drilling method capable of fully inverting acoustic properties in a material according to an embodiment for use in conjunction with the system of FIG. 3.

FIG. 3 is a simplified block diagram of a generic logging/LWD system 100, 100' according to one or more embodiments, which may be used in the logging system 100 of FIG. 1 and/or the LWD system 100' of FIG. 2. Details specific to the implementation within a wireline logging system or a LWD system are omitted for simplicity. FIG. 4 is a flowchart of a method 200 according to one or more embodiments of fully inverting acoustic properties of a material, such as cement sheath 20 or a gap 22 located therein, including density and the speed of sound, which may be used in conjunction with the system of FIG. 3.

Referring to FIGS. 3 and 4, system 100, 100' includes a logging tool 110, 110', which may be disposed within wellbore 13 adjacent to casing 19, cement sheath 20, and formation 21. A void or defect 22 is shown in cement sheath 20. Wellbore 14 may contain a fluid 45, which may be any well fluid, including drilling mud 46 (FIG. 2). Logging tool 110, 110' may include a nuclear source 140 and a nuclear detector 142. Nuclear source 140 may be operable to provide gamma rays or X-rays, which may be characterized by but are not necessarily limited to an energy level ranging between 100 keV and 350 keV. An X-ray 144 may be emitted from nuclear source 140 through fluid 45, casing 19, and into cement sheath 20. Nuclear detector 142 may be operable to receive and measure a backscatter 146 from nuclear source 140.

System 100, 100' may include processor system 114, which may include memory 150 and a microprocessor 152 or the like. Processor system 114 may be collocated with logging tool 110, 110', located at the surface of wellbore 13, may be remotely located from system 100, 100', or may be a distributed system located in one or more of the above. Processor system 114 may include analog circuitry such as oscillators, phase lock loops, amplifiers, frequency multipliers, frequency dividers, filters, phase detectors, mixers, and the like. Processor system 114 may include digital circuitry such microprocessor 152, microcontrollers, field-programmable gate arrays, digital-to-analog converters, analog-to-digital converters, buffers, latches, memory 150, drivers, multiplexors, universal asynchronous receivers/transmitters, and the like. Memory 150 may include both random access memory (RAM) and non-volatile memory such as Flash memory or electrically erasable programmable read-only memory (EEPROM). Discrete electronic components may be combined in one or more application-specific integrated circuits (ASICs) as appropriate.

Nuclear source 140 and nuclear detector 142 may be operatively coupled to processor system 114. As shown in step 204, processor system 114 may be operable to control nuclear source 140, receive backscatter data about a volume of investigation 145 from nuclear detector 142, and generate a density map 160 of cement sheath 20 from the backscatter data. Memory 150 may be used to store density map 160. Uncertainty of nuclear backscatter technology of density detection may be within 15 percent.

In one or more embodiments, logging tool 110, 110' may include an ultrasonic transmitter 170 and ultrasonic detector 172. Ultrasonic transmitter 170 and ultrasonic detector 172 may be located near to nuclear source 140 or nuclear detector 142. Ultrasonic transmitter 170 and ultrasonic detector 172 may be operatively coupled to processor system 114. As shown in step 216, processor system 114 may be operable to control ultrasonic transmitter 170, received reflected ultrasonic data about volume of investigation 145 from ultrasonic detector 172, and generate a measured acoustic impedance $Z_m$.

The acoustic impedance Z, which may be expressed using the units of MRayls, is the product of material density $\rho$ and the velocity of sound v in the material. In terms of the definition of acoustic impedance Z, sound velocity v may be calculated with a known density $\rho$. Accordingly, at step 220, from the measured acoustic impedance $Z_m$ provided by ultrasonic logging technology and density map 160 provided by nuclear logging technology, a sound velocity map 162 of the speed of sound within the cement sheath 20 may be calculated by processor system 114.

Although a logging tool 110, 110' is disclosed herein having collocated nuclear logging components and ultrasonic logging components, should be understood that separate nuclear and ultrasonic logging tools may be used.

In one or more embodiments, at step 208, processor system 114 may include a mathematical acoustic model 164 of casing 19 and cement sheath 20, which may be stored in memory 150. A simulated acoustic impedance $Z_s$ may be calculated from acoustic model 164 at step 212. At step 220, using the simulated acoustic impedance $Z_s$ and density map 160, sound velocity map 162 of the speed of sound within the cement sheath 20 may be calculated by processor system 114. At step 224, acoustic model 164 may be validated by comparison of simulated acoustic impedance $Z_s$ with measured acoustic impedance $Z_m$, as described in greater detail hereinafter.

Creation of acoustic model 164 is now described. In geophysics, laws of physics allow for computing data about physical parameters, such as such as the speed of sound in a material, given a model. Such computations may be referred to as forward problem solving. In the inverse problem, the goal is to construct a suitable model from a set of measurements. Ideally, an exact theory exists that dictates how data may be transformed in order to produce such model. However, typically only a finite amount of data is available, with many degrees of freedom. Moreover, the measured data may contain errors. Accordingly many models may be possible that explain the measured data equally well. Inversion is a mathematical process by which a model may be estimated and appraised from a set of data.

According to one or more embodiments, initial acoustic models of wellbore 13 based on ultrasonic properties may be provided using transmission line theory from electromagnetics. The acoustic models may assume a vertical plane wave as an incident signal and flat plates for casing 19, cement 20, and formation 21. The plane wave may be assumed to have normal incidence to the flat plates. Applying transmission line theory from electromagnetics, two models may be provided: A 4-layer model, which represents a gapless cement sheath 20, and a 5-layer model, which includes a gap or void 22 within cement sheath 20 as an additional layer.

Figure 5:
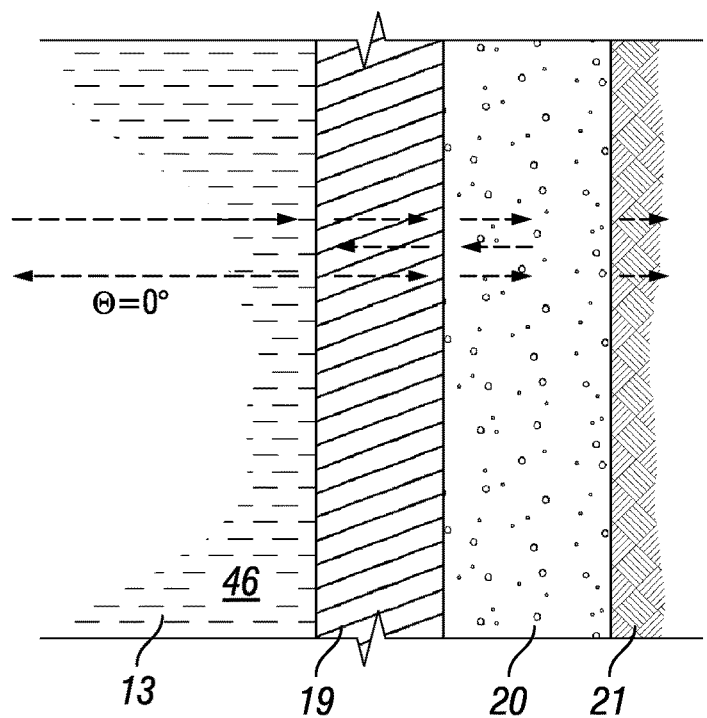
FIG. 5 is an elevation view of an exemplary wellbore forming the basis of a 4-layer acoustic model according to an embodiment, showing drilling fluid, casing, a cement sheath, and the formation.

Referring to FIG. 5, the 4-layer model represents drilling fluid 46, casing 19, cement sheath 20, and formation 21. Attenuation of mud is not taken account in this disclosure. Reflection and refraction coefficients may be given in terms the acoustic impedance of adjacent flat plate materials by equations 1 and 2, respectively:

$$r_p = \frac{Z_2 - Z_1}{Z_2 + Z_1} \quad \text{Eq. 1}$$

$$t_p = \frac{2Z_2}{Z_2 + Z_1} \quad \text{Eq. 2}$$

in which $Z_1$, $Z_2$ represent normal vectors of acoustic impedance at an interface. For example, in the case of the drilling fluid/casing interface, $Z_1$ and $Z_2$ represent acoustic impedances of drilling mud 46 and casing 19, respectively. In the case of the casing/cement interface, $Z_1$ and $Z_2$ represent acoustic impedances of casing 19 and cement sheath 20, respectively. Impedance Z, which may be expressed using the units of MRayls, is the product of material density ρ and velocity v of sound in the material.

Figure 7:
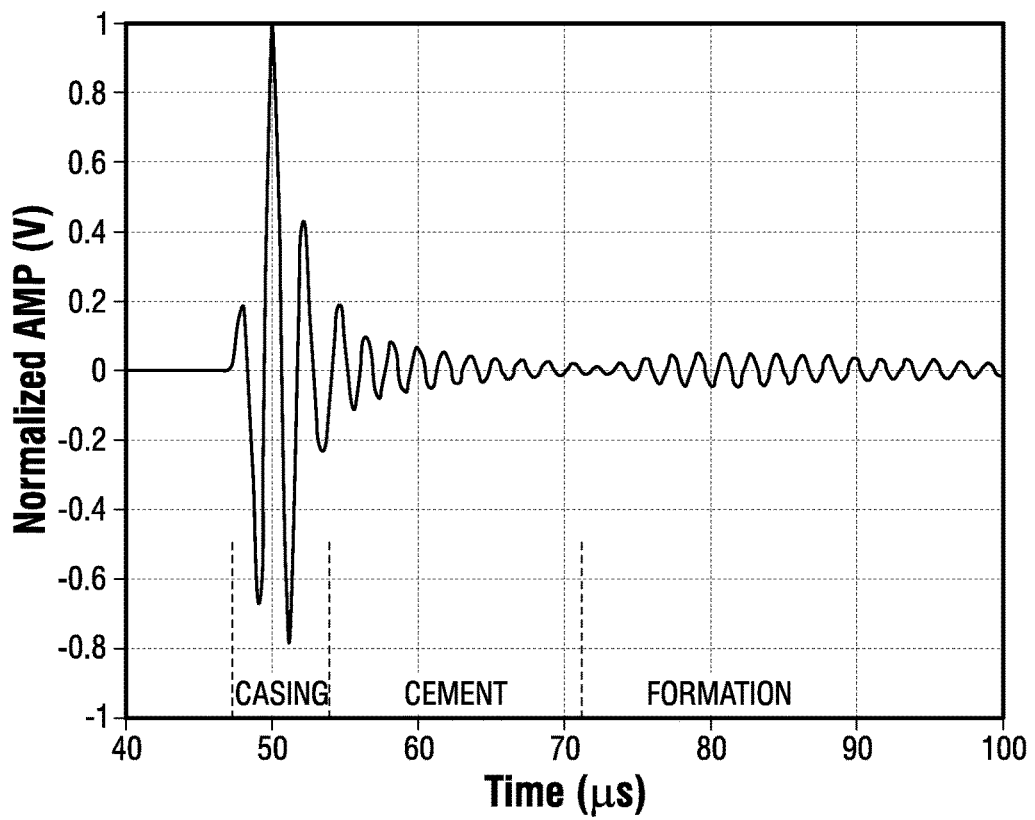
FIG. 7 is a plot of a simulated ultrasonic pulse-echo analysis based on the 4-layer acoustic model of FIG. 5.

A simulation using the 4-layer acoustic model is illustrated in FIG. 7, which demonstrates a typical result of ultrasonic logging in the cased hole. Arbitrary arrivals of drilling fluid reflection, ringing and formation reflections are indicated. As shown in FIG. 7, the tail of ringing contains information of cement impedance and casing thickness.

Figure 6:
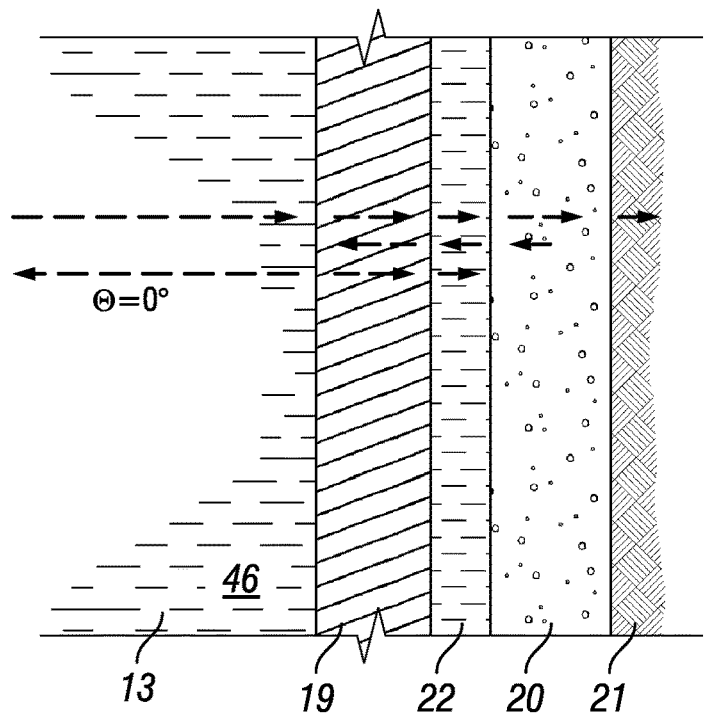
FIG. 6 is an elevation view of an exemplary wellbore forming the basis of a 5-layer acoustic model according to an embodiment, showing drilling fluid, casing, a void, a cement sheath, and the formation.

Referring to FIG. 6, the 5-layer acoustic model represents drilling fluid 46, casing 19, cement sheath 20, and formation 21. A thin gap 22, which may be filled with water, is added between casing 19 and cement sheath 20 as the fifth layer to simulate a flaw effect on the ultrasonic data.

Figure 8:
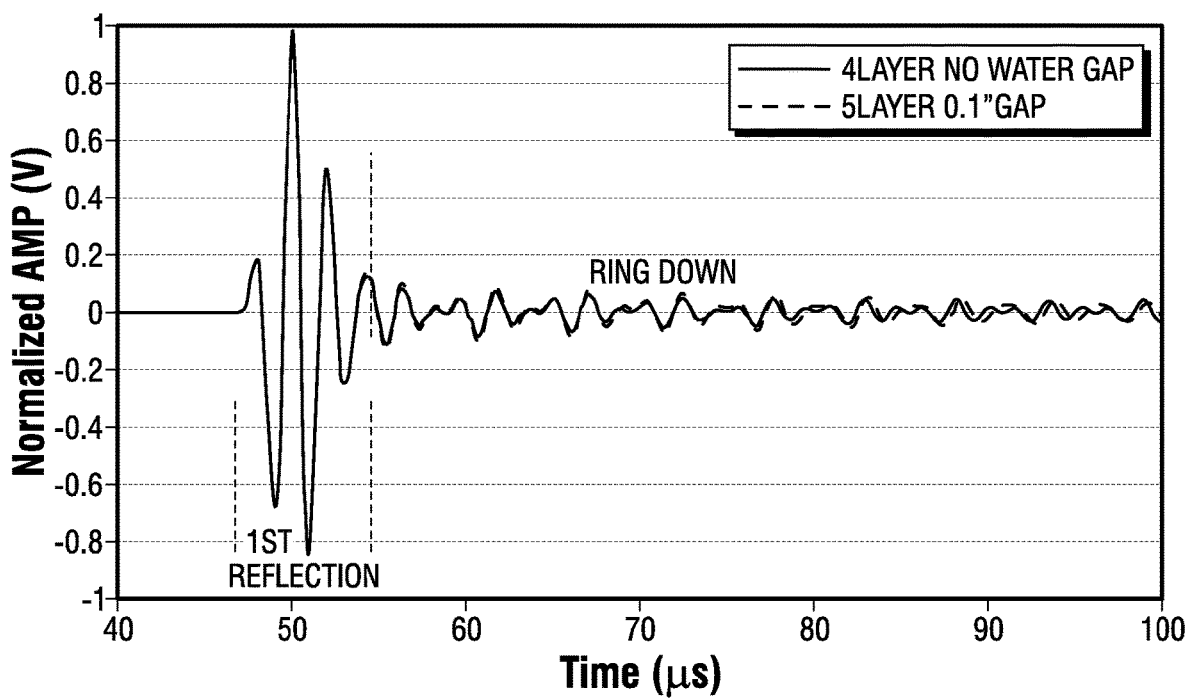
FIG. 8 is a combined plot of a simulated ultrasonic pulse-echo analysis based on the 4-layer acoustic model of FIG. 5 and a simulated ultrasonic pulse-echo analysis based on the 5-layer acoustic model of FIG. 6.

FIG. 8 compares the signals between the 4-layer and 5-layer models and illustrates the gap effect on ultrasonic signals. The first reflections match perfectly, which is consistent with the theoretical principle that the first reflection is independent of the material behind the casing. Ringing of the 5-layer model is characterized by a larger amplitude than ringing of the 4-layer model. The phase shift between the two models gradually also increases over time due to the gap effect.

Figure 9:
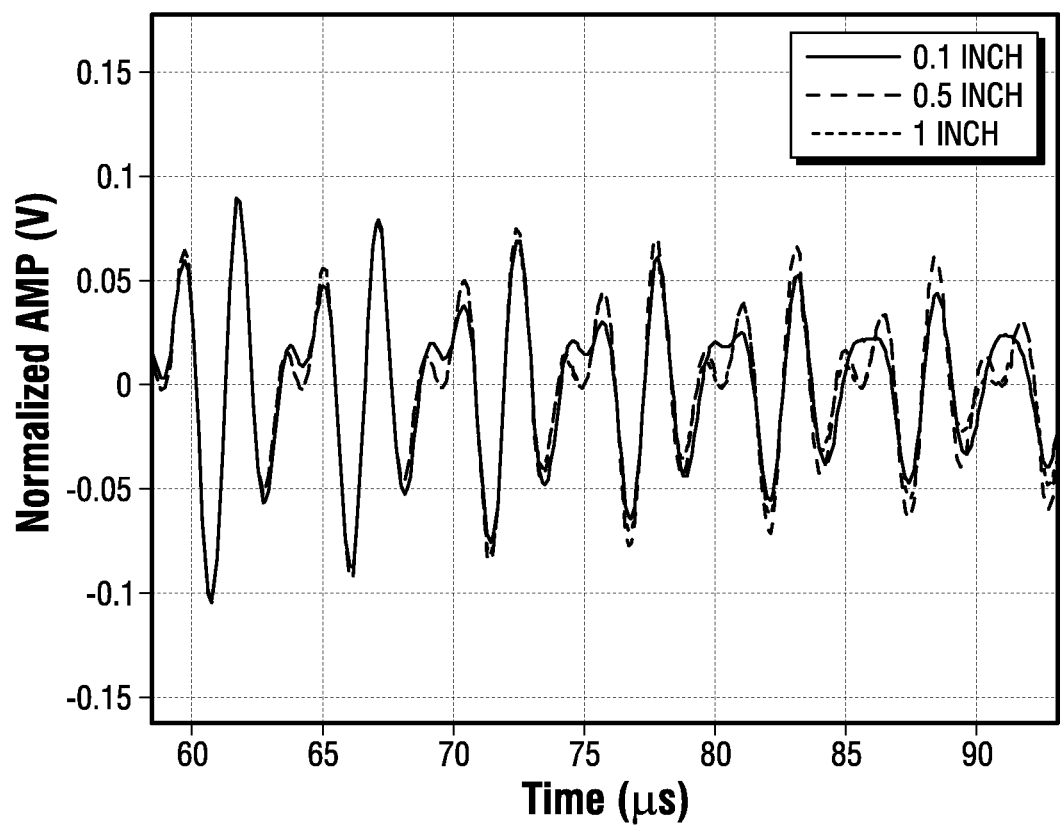
FIG. 9 is a combined plot of three simulated ultrasonic pulse-echo analyses based on the 5-layer acoustic model of FIG. 6, showing results for gaps of three varying thicknesses.

FIG. 9 illustrates the effect of gaps 22 (FIG. 6) of different thickness on the ultrasonic pulse-echo data. Plots for three gap sizes, 0.1 in., 0.5 in., and 1.0 in. are superimposed. The first two reverberations from different gap thickness are difficult to distinguish. With increasing time, the discrepancy of latter reverberations due to different gap thickness is enhanced and becomes larger. This simulation demonstrates sensitivity of ultrasonic logging to the gap thickness.

System 100, 100' combines nuclear logging with ultrasonic logging techniques to fully recover acoustic properties of materials behind casing 19. A full inversion model may be based on the above ultrasonic simulation models and a density determined by nuclear logging.

A cost function may be defined as:

$$C(x) = \Sigma_{t=0}^{end}(x_{m,t} - x_{s,t})^2 \quad \text{Eq. 3}$$

where $x_{m,t}$ and $x_{s,t}$ are measured signals by an ultrasonic pulse-echo tool, such as ultrasonic transmitter and detector 170, 172 (FIG. 3), and a simulated signal from the previously-described acoustic model 164, respectively.

Figure 10:
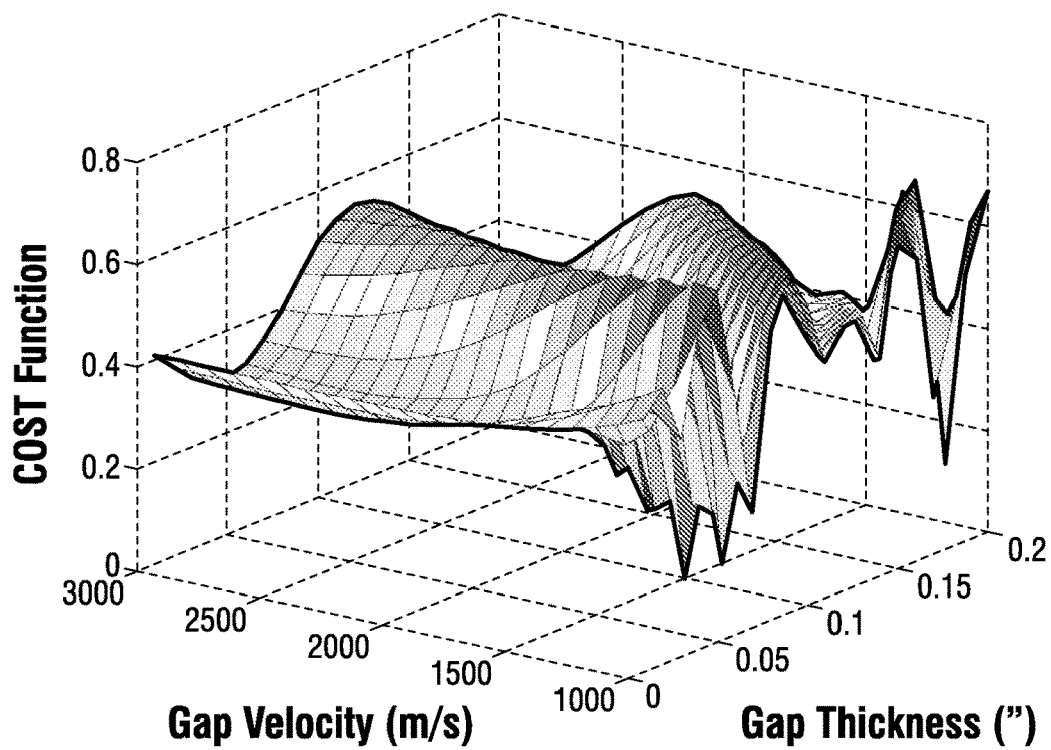
FIG. 10 is a plot of a cost function validating a full inversion acoustic model according to an embodiment, comparing a measured signal from an ultrasonic pulse-echo tool with a simulated signal calculated from the full inversion acoustic model using density data provided by a nuclear logging technique with zero percent uncertainty.
Figure 11:
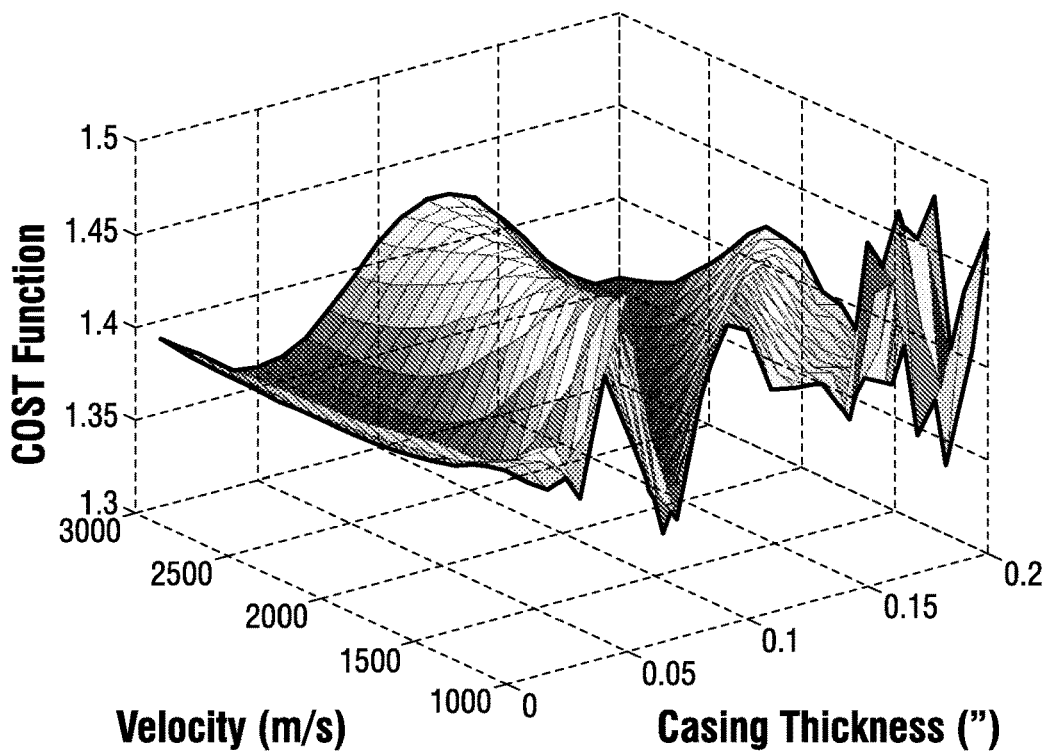
FIG. 11 is a plot of a cost function validating a full inversion acoustic model according to an embodiment, comparing a measured signal from an ultrasonic pulse-echo tool with a simulated signal calculated from the full inversion acoustic model using density data provided by a nuclear logging technique with fifteen percent uncertainty.

FIG. 10 is a plot of the cost function of Equation 3 of the inversion model with zero percent uncertainty of the density parameter p measured by nuclear backscatter technology. The cost function is plotted as a function of sound velocity v within and thickness of gap 22. Similarly, FIG. 11 is a plot of the cost function of the inversion model with 15 percent maximum uncertainty of the density parameter p measured by nuclear backscatter technology. FIG. 11 illustrates the sensitivity of ultrasonic data to the uncertainty of density ρ measured by the backscatter technique. Although 15 percent maximum uncertainty is added, the inversion result is nearly the same as that of FIG. 10, which implies sound velocity v has higher order sensitivity than material density ρ to ultrasonic signals.

This forgoing disclosure presents a novel joint technology of using ultrasonic logging and nuclear logging to determine the material properties (density, velocity and acoustic impedance) of a gap in a cased hole, thereby enhancing the certainty of gap detection. This joint technique provides a full inversion model based on ultrasonic simulation in a multi-layered flat plate model with a vertical incident plane wave. The full inversion model is capable of inverting acoustic velocity, density and acoustic impedance of a gap behind the casing. By using the joint information from nuclear logs, the complexity of the inversion model is reduced and its efficiency is improved. With full inverted acoustic parameters, petrophysicits or formation evaluation log analysts can determine the material behind the casing with higher confidence.

In summary, a method for evaluating a cement sheath located outside of a casing in a wellbore, a method for providing an inversion model to fully predict acoustic properties of a material, and a system for evaluating a cement sheath. Embodiments of a method for evaluating a cement sheath located outside of a casing in a wellbore may generally include: Determining a density map of the cement sheath using a nuclear logging technique; providing an acoustic impedance value of the cement sheath; and determining a map of the speed of sound in the cement sheath using the density map and the acoustic impedance value. Embodiments of a method for providing an inversion model to predict properties of a cement sheath located outside of a casing in a wellbore may generally include: Providing an acoustic model of the cement sheath as a function of acoustic impedance; determining a density map of the cement sheath using a nuclear logging technique; and inverting the acoustic model using the density map to determine a map of the speed of sound in the cement sheath. Embodiments of a system for evaluating a cement sheath located outside of a casing in a wellbore may generally have: A downhole logging tool arranged for determining a density map of the cement sheath using a nuclear logging technique; and a processor system arranged for determining a map of the speed of sound in the cement sheath using the density map and an acoustic impedance value of the cement.

Any of the foregoing embodiments may include any one of the following, alone or in combination with each other: Emitting a X-ray from a X-ray source disposed within the wellbore; measuring a backscatter of the X-ray by a X-ray detector disposed within the wellbore; determining the density map from the backscatter; the X-ray is characterized by an energy level ranging between 100 keV and 350 keV; determining a measured acoustic impedance of the cement sheath using an ultrasonic logging technique; using the measured acoustic impedance as the acoustic impedance value; the ultrasonic logging technique is a pulse-echo technique; transmitting an ultrasonic wave by an ultrasonic transmitter disposed within the wellbore; measuring a reflected ultrasonic wave by an ultrasonic receiver disposed within the wellbore; determining the measured acoustic impedance from the transmitted and reflected ultrasonic waves; providing an acoustic model of the cement sheath; calculating a simulated acoustic impedance of the cement sheath from the acoustic model; using the simulated acoustic impedance as the acoustic impedance value; the acoustic model approximates the casing and the cement sheath as flat plates and assumes a vertically-oriented plane wave incident signal; determining a measured acoustic impedance of the cement sheath using an ultrasonic logging technique; validating the acoustic model by comparing the measured acoustic impedance to the simulated acoustic impedance; emitting a X-ray from a X-ray source disposed within the wellbore; measuring a backscatter of the X-ray by a X-ray detector disposed within the wellbore; determining the density map from the backscatter; transmitting an ultrasonic wave by an ultrasonic transmitter disposed within the wellbore; measuring a reflected ultrasonic wave by an ultrasonic receiver disposed within the wellbore; determining the measured acoustic impedance from the transmitted and reflected ultrasonic waves; a X-ray source; a X-ray detector disposed so as to detect a backscatter from the X-ray source; whereby the density map may be determined from the backscatter; the X-ray source is operable to produce X-rays an energy level ranging between 100 keV and 350 keV; an ultrasonic transmitter operable to transmit an ultrasonic wave; an ultrasonic receiver operable to measure a reflected ultrasonic wave; the processor system operable for determining a measured acoustic impedance from the transmitted and reflected ultrasonic waves and using the measured acoustic impedance as the acoustic impedance value; the processor system includes an acoustic model of the cement sheath; the processor is operable to calculate a simulated acoustic impedance of the cement sheath from the acoustic model and use the simulated acoustic impedance as the acoustic impedance value; and the acoustic model approximates the casing and the cement sheath as flat plates and assumes a vertically-oriented plane wave incident signal.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed:

1. A method for evaluating a cement sheath located outside of a casing in a wellbore, comprising:
   determining a density map of said cement sheath using a nuclear logging technique;
   providing an acoustic impedance value of said cement sheath, the acoustic impedance value being provided by:
      providing an acoustic model of said cement sheath;
      calculating a simulated acoustic impedance of said cement sheath from said acoustic model; and
      using said simulated acoustic impedance as said acoustic impedance value; and
   determining a map of the speed of sound in said cement sheath using said density map and said simulated acoustic impedance.

2. The method of claim 1 further comprising:
   emitting a X-ray from a X-ray source disposed within said wellbore;
   measuring a backscatter of said X-ray by a X-ray detector disposed within said wellbore; and
   determining said density map from said backscatter.

3. The method of claim 2 wherein:
   said X-ray is characterized by an energy level ranging between 100 keV and 350 keV.

4. The method of claim 1 wherein:
   said ultrasonic logging technique is a pulse-echo technique.

5. The method of claim 1, wherein:
   said acoustic model approximates said casing and said cement sheath as flat plates and assumes a vertically-oriented plane wave incident signal; or
   the method further comprises determining a measured acoustic impedance of said cement sheath using an ultrasonic logging technique, and validating said acoustic model by comparing said measured acoustic impedance to said simulated acoustic impedance.

6. A method for providing an inversion model to predict properties of a cement sheath located outside of a casing in a wellbore, comprising:
   providing an acoustic model of said cement sheath as a function of acoustic impedance, wherein said acoustic model approximates said casing and said cement sheath as flat plates and assumes a vertically-oriented plane wave incident signal;
   determining a density map of said cement sheath using a nuclear logging technique; and
   inverting said acoustic model using said density map and a simulated acoustic impedance to determine a map of the speed of sound in said cement sheath.

7. The method of claim 6 further comprising:
   emitting a X-ray from a X-ray source disposed within said wellbore;
   measuring a backscatter of said X-ray by a X-ray detector disposed within said wellbore; and
   determining said density map from said backscatter.

8. The method of claim 7 wherein:
   said X-ray is characterized by an energy level ranging between 100 keV and 350 keV.

9. The method of claim 6 further comprising:
   determining a measured acoustic impedance of said cement sheath using an ultrasonic logging technique; and
   validating said acoustic model by comparing said measured acoustic impedance to a simulated acoustic impedance calculated using said acoustic model.

10. The method of claim 9 wherein:
    said ultrasonic logging technique is a pulse-echo technique; or
    the method further comprises transmitting an ultrasonic wave by an ultrasonic transmitter disposed within said wellbore, measuring a reflected ultrasonic wave by an ultrasonic receiver disposed within said wellbore, and determining said measured acoustic impedance from said transmitted and reflected ultrasonic waves.

11. A system for evaluating a cement sheath located outside of a casing in a wellbore, comprising:
    a downhole logging tool arranged for determining a density map of said cement sheath using a nuclear logging technique; and
    a processor system arranged for determining a map of the speed of sound in said cement sheath using said density map and an acoustic impedance value of said cement, wherein:
       said processor system includes an acoustic model of said cement sheath; and
       said processor is operable to calculate a simulated acoustic impedance of said cement sheath from said acoustic model and use said simulated acoustic impedance as said acoustic impedance value.

12. The system of claim 11 wherein said downhole logging tool comprises:
a X-ray source; and
a X-ray detector disposed so as to detect a backscatter from said X-ray source;
whereby said density map may be determined from said backscatter.

13. The system of claim 12 wherein:
said X-ray source is operable to produce X-rays an energy level ranging between 100 keV and 350 keV.

14. The system of claim 11 wherein:
said acoustic model approximates said casing and said cement sheath as flat plates and assumes a vertically-oriented plane wave incident signal.

* * * * *